US008601602B1

(12) United States Patent
Zheng

(10) Patent No.: US 8,601,602 B1
(45) Date of Patent: Dec. 3, 2013

(54) ENHANCED MULTI-FACTOR AUTHENTICATION

(75) Inventor: Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 12/872,111

(22) Filed: Aug. 31, 2010

(51) Int. Cl.
*G06F 21/00* (2013.01)
(52) U.S. Cl.
USPC .......................... 726/29; 726/2; 726/5; 726/6
(58) Field of Classification Search
USPC ............................................ 726/1–21, 26–30
See application file for complete search history.

(56) References Cited

U.S. PATENT DOCUMENTS

| | | | | |
|---|---|---|---|---|
| 7,600,676 B1 * | 10/2009 | Rados et al. | .................. | 235/380 |
| 7,979,899 B2 * | 7/2011 | Guo et al. | .......................... | 726/7 |
| 2003/0046589 A1 | 3/2003 | Gregg | | |
| 2005/0044393 A1 * | 2/2005 | Holdsworth | .................. | 713/200 |
| 2010/0063895 A1 | 3/2010 | Dominguez et al. | | |

OTHER PUBLICATIONS

Office Action dated Dec. 29, 2011 for U.S. Appl. No. 13/249,329, 33 pages.
Notice of Allowance issued in U.S. Appl. No. 13/249,329 on Jun. 12, 2012, 21 pages.

* cited by examiner

*Primary Examiner* — Jung Kim
*Assistant Examiner* — Tri Tran
(74) *Attorney, Agent, or Firm* — Fish & Richardson P.C.

(57) ABSTRACT

Methods, systems, and apparatus, including computer programs encoded on a computer storage medium, for performing multi-factor authentication. In one aspect, a method includes determining that the identity of a user has been successfully proven using a first of two or more authentication factors, allowing updates or requests for updates to be initiated after the identity of the user has been successfully proven using the first authentication factor, logging the updates or requests for updates that are initiated after the identity of the user has been successfully proven using the first authentication factor, determining that the identity of the user has not been successfully proven using a second of the two or more authentication factors, and reverting the updates, or discarding the requests for updates, based on determining that the identity of the user has not been successfully proven using the second authentication factor.

27 Claims, 4 Drawing Sheets

ENHANCED MULTI-FACTOR AUTHENTICATION

BACKGROUND

The present specification relates to multi-factor authentication.

Before accessing secure data or entering a secure area, a user may be required to authenticate themselves. Authentication may be performed, for example, using different "authentication factors," i.e., (i) information that the user knows, such as a password or a Personal Identification Number (PIN), (ii) information that the user uniquely possesses, such as a passport, token, mobile device, or identification card, or (iii) characteristics of the user, including biometric data such as fingerprints or the face geometries. As used by this specification, the term "multi-factor authentication" refers to using two or more different authentication factors when authenticating a user, to increase the assurance that the user has actually been authorized to access a secure system.

SUMMARY

According to one innovative aspect of the subject matter described in this specification, because a second authentication may take a substantial amount of time to perform or may require several manual steps, a requestor may be given limited or full access to a computer system after they have successfully authenticated themselves using a first authentication factor. Actions taken by the requestor after successfully authenticating themselves using the first authentication factor but before completing the second authentication factor are logged. If the requestor eventually does not successfully authenticate themselves using the second authentication factor, the logged actions may be uncommitted, discarded, rolled back, reverted, or otherwise reversed.

In doing so, a user may still have access to a computer system before completing a time consuming, second or subsequent authentication factor, however accesses that turn out to be improper will have little or no long term, damaging effect. A rollback or reversion may be performed when a requestor enters incorrect information, such as a wrong password, when the authorized user explicitly indicates that they are not the requestor, or when a predetermined period of time elapses after the successful completion of the first authentication factor, without successfully completing the second authentication factor.

Another innovative aspect of the subject matter described in this specification is embodied in methods that include the actions of determining that a user has successfully proven his or her identity using a first factor, granting the user access to a system, logging updates or requests for updates initiated by the user, and determining whether the user has successfully proven his or her identity using a second factor. If identity is not proven using the second factor, updates are reverted and requests for updates are discarded. If identity is proven using the second factor, updates are confirmed and requests for updates are committed.

In general, another aspect of the subject matter described in this specification may be embodied in methods that include the actions of determining that the identity of a user has been successfully proven using a first of two or more authentication factors, allowing updates or requests for updates to be initiated after the identity of the user has been successfully proven using the first authentication factor, logging the updates or requests for updates that are initiated after the identity of the user has been successfully proven using the first authentication factor, determining that the identity of the user has not been successfully proven using a second of the two or more authentication factors, and reverting the updates, or discarding the requests for updates, based on determining that the identity of the user has not been successfully proven using the second authentication factor.

Other embodiments of these aspects include corresponding systems, apparatus, and computer programs, configured to perform the actions of the methods, encoded on computer storage devices.

These and other embodiments may each optionally include one or more of the following features. For instance, the actions include transmitting a message to the user's mobile device to allow the user to prove their identity using the second of the two or more authentication factors; determining that the user has not successfully proven their identity using the second authentication factor further includes receiving information that the user has entered in response to the second authentication factor; and determining, based on the information that the user has entered, that the identity of the user has not been successfully proven; determining that the user has not successfully proven their identity using the second authentication factor further includes receiving information that someone other than the user has entered in response to the second authentication factor, and determining, based on the information that the someone other than user has entered, that the identity of the user has not been successfully proven; determining that the user has not successfully proven their identity using the second authentication factor further includes determining that a predetermined period of time has elapsed, and determining, based on determining that the predetermined period of time has elapsed, that the identity of the user has not been successfully proven. the actions include enabling updates or requests for updates to be initiated after the identity of the user has been successfully proven using the first authentication factor and before the identity of the user has been successfully or unsuccessfully proven using the second authentication factor; the actions include logging updates or requests for updates that are initiated after the identity of the user has been successfully proven using the first authentication factor further includes logging a current password and a new password, and reverting the updates or discarding the requests for updates based on determining that the identity of the user has not been successfully proven using the second authentication factor further includes changing the new password back to the current password; logging updates or requests for updates are initiated after the identity of the user has been successfully proven using the first authentication factor further includes logging a request to transfer money, and reverting the updates or discarding the requests for updates based on determining that the identity of the user has not been successfully proven using the second authentication factor further includes discarding the request without transferring the money; logging updates or requests for updates are initiated after the identity of the user has been successfully proven using the first authentication factor further includes logging an item that has been placed into an electronic shopping cart, and reverting the updates or discarding the requests for updates based on determining that the identity of the user has not been successfully proven using the second authentication factor further includes removing the item from the electronic shopping cart; logging updates or requests for updates are initiated after the identity of the user has been successfully proven using the first authentication factor further includes logging an order, and reverting the updates or discarding the requests for updates based on determining that the identity of the user has not been successfully proven using the second authentication factor further includes canceling the order; logging updates or requests for updates are initiated after the identity of the user has been successfully proven using the first authentication factor further includes logging an old value and a new value, and reverting the updates or discarding the requests for updates based on determining that the identity of the user has not been successfully proven using the second authentication factor further includes changing the new value back to the old value; the actions further include, based on determining that the identity of the user has not been successfully proven using the second authentication factor, transmitting a message to the user's mobile device to indicate that information used to prove the user's identity using the first authentication factor may have been compromised; the actions further include, based on determining that the identity of the user has not been successfully proven using the second authentication factor, disabling an account of the user; the actions further include, based on determining that the identity of the user has not been successfully proven using the second authentication factor; transmitting a message to the user's mobile device to initiate an automated password change protocol on the mobile device; and/or the actions further include installing an application on a mobile device associated with the user, where the application facilitates proving the identity of the user using the second authentication factor.

Advantageous implementations may include one or more of the following features. Users may be enabled to interact with accounts during a multifactor authentication process, thereby providing convenience to users. After gaining access to a system, a mobile device interface may enable users to quickly confirm their identities. System access delays caused by second or subsequent authentication factors may be negated, without reducing system security.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
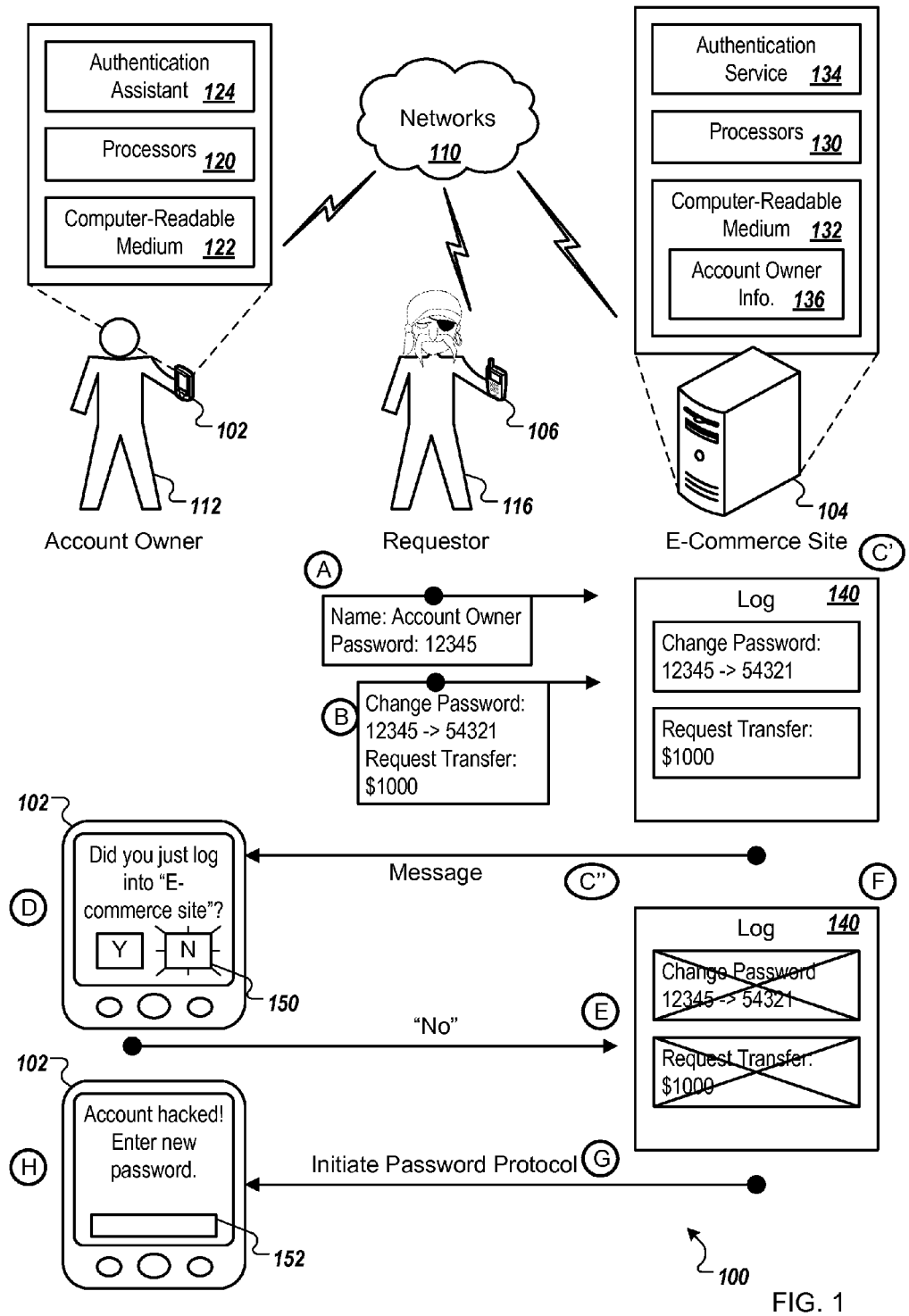
FIGS. 1 and 3 are diagrams of example systems that may authenticate user identity.

FIG. 1 is a diagram of an example system 100 that may authenticate user identity. FIG. 1 also illustrates an example flow of data, shown in states (A) to (H), as well as user interfaces that are shown on a mobile client communication device ("client device") 102 during states (D) and (H), and actions performed by a server 104 during states (C'), (F), and (G). States (A) to (H) may occur in the illustrated sequence, or they may occur in a sequence that is different than the illustrated sequence.

In general, user authentication performed by the system 100 may be based on multiple authentication factors. For example, to authenticate themselves using a first authentication factor, a user may initially request access to information stored on the server 104 by providing authentication data (e.g., an ID and password).

Upon verifying the authentication data, the server 104 may grant access to the user and may log updates and requests for updates initiated by the user. The server 104 may, to authenticate the user using a second authentication factor, send a message to a client device 102 that is paired or otherwise associated with the user, or with user-provided authentication data.

The message may include information related to the granting of access and/or to the updates or requests for updates. The message may include a request for a response from a user of the client device 102. For example, the user of the client device 102 may respond to the message simply by interacting with a graphical or voice interface on the device, rather than memorizing and re-typing or pasting lengthy verification codes.

If the user of the client device 102 refutes the initial authentication attempt or fails to respond, the server 102 may revert updates or discard requests for updates. By enabling users to interact with software applications provided by the server 104 during a multiple factor authentication process, the system 100 provides convenience while maintaining security.

In further detail, the system 100 includes the client device 102 (operated by a valid "account owner" 112), a client device 106 (operated by an unauthorized "requestor" 116), and the server 104, in communication over one or more networks 110. The client devices 102, 106, may be smart phones, tablet computers, notebook computers, desktop computers, or any other computer devices.

The client device 102 includes one or more processors 120 configured to execute instructions stored by a computer-readable medium 122 for performing various device operations, such as input/output, communication, data processing, and the like. The processor 120 may be used to execute an authentication assistant application 124 for sending and receiving authentication-related data to and from the server 104, for presenting information to a device user, and for receiving and processing user input. The authentication assistant 124 may be installed on the client device by the server 104, i.e., before completing the first authentication factor, and may be used to facilitate the completion of the second authentication factor.

The server 104 may include one or more servers (e.g., a server farm) including one or more processors 130 configured to execute instructions stored by a computer-readable medium 132 for performing various server operations. In the present example, the server 104 may be configured to run an e-commerce site enabling site users to access their accounts and request various account transactions; however, other examples may include other types of sites, such as banking sites, or any sort of site used to access financial or personal information. The e-commerce site may include an authentication service 134 for determining the identity of a user of the site using multiple authentication factors. With the permission of the account owner 112, the authentication service 134 may install applications on the client device 102, such as applications that facilitate the completion of the second authentication factor.

Additionally, the e-commerce site may store and maintain account owner information 136. For example, the account owner information 136 may include information related to user accounts (e.g., user names, user IDs, passwords, account numbers, account balances, and the like), and information related to user devices (e.g., phone numbers, e-mail addresses, instant messaging addresses, Media Access Control (MAC) addresses, Internet Protocol (IP) addresses, and the like).

The networks 110 connecting the devices 102, 106, and the server 104 may be wired or wireless, and may include a packet-based network, such as a TCP-IP network. The networks 110 may include a local area network (e.g., an intranet), wide area network, the Internet, or any appropriate combination thereof.

Referring to the example data flow, during state (A), the requestor 116 uses the client device 106 to provide an initial authentication factor (e.g., a name and password) of the account owner 112 to the e-commerce site executed by the server 104. For example, the requestor 116 may have intercepted the name and password of the account owner 112, or may have discovered the name and password by some other approach, such as a 'brute force' hack.

The e-commerce site may receive the name and password, reference the corresponding account owner information 136 and determine whether the user identity of the account owner 112 has been successfully proven. Upon verification of the provided user name and password, for example, the e-commerce site may grant account access to the requestor 116, allowing the requestor 116 to, during state (B), initiate updates or requests for updates. In the present example, the requestor 116 changes the account password, and requests a transfer of account funds.

During state (C'), the e-commerce site logs the updates or requests for updates. Based on the change to the account password, for example, the e-commerce site may update the account password and save the updated and previous account passwords to a log 140. Based on the request for a transfer of account funds, for example, the e-commerce site may save the request for transfer to the log 140, without committing the transaction. State (C') may occur before, during, or after state (C").

In some implementations, updates or requests for updates may be enabled after the identity of a user has been proven using an initial authentication factor and before the identity of the user has been successfully proven or unsuccessfully proven using a subsequent authentication factor. For example, the e-commerce site may grant account access during a period of time after receiving valid account credentials from the requestor 116 and before receiving confirmation sent from a device associated with the account owner 112.

In some cases, account access granted during the period of time may be limited. For example, the e-commerce site may limit access to certain account functions (e.g., transactions below a certain monetary threshold) and information (e.g., sensitive information, such as passwords or credit card numbers), and may log requested account changes until confirming the identity of the user.

During state (C"), the e-commerce site transmits a message to a device associated with the owner of the accessed account. By sending messages, the e-commerce site may request that users with account access to prove their identities using a secondary authentication factor (e.g., possession of a particular device). In general, messages sent by the e-commerce site may be formatted to trigger an action (e.g., presenting an alert) on the client device 102, enabling users to confirm the secondary authentication without performing onerous operations, such as manually typing or pasting in verification codes. State (C") may occur before, during, or after state (C').

The e-commerce site may access the account owner information 136 to identify the client device 102 associated with the account owner 112, and to identify a protocol for communicating with the device 102. The e-commerce site may generate an appropriate message for sending to the device 102, and may send the message using the protocol. In some implementations, the message may be based at least in part on user interactions with the account. For example, the message may include information related to the requested change to account password, the requested transfer of account funds, or any other interaction. In other implementations, the message may simply ask the account owner 112 whether they have logged into the e-commerce site, because the message may be sent as soon as the first authentication process is completed, i.e., before any updates or requests for updates have been initiated.

During state (D), the device associated with the owner of the accessed account receives the message. For example, the authentication assistant 124 executed by the client device 102 may monitor incoming messages and may recognize messages having a particular format or using a particular protocol.

Based on receiving the message, for example, the authentication assistant 124 may present an alert to the account owner 112. In the present example, the device 102 displays message text to the account owner 112 inquiring whether the account owner had logged in to the e-commerce site 104. The message may be visually displayed within an application window or on device wallpaper, and may include other alerting mechanisms, such as sound and vibration.

In FIG. 1, upon receiving the message, the account owner 112 indicates that he or she did not log into the e-commerce site 104. For example, the account owner 112 may respond to the presented message text (e.g., "Did you just log into 'E-commerce site'?") by selecting a user interface control 150 associated with the response "No". As another example, a voice interface may be used to enable the account owner 112 to speak the "No" response. Based on the response of account owner 112, for example, a response message may be generated by the client device 102 and transmitted to the e-commerce site.

During state (E), the e-commerce site determines that the identity of the account user has not been proven using the secondary authentication factor. For example, the e-commerce site may receive the response message (e.g., the response "No") from the client device 102. Based on the information provided by the account owner 112, for example, the e-commerce site may determine that the requestor 116 does not possess the device 102, and is therefore not the account owner 112.

During state (F), account updates are reverted, and requests for account updates are discarded by the e-commerce site, based on the determination that the identity of the account user has not been proven using the secondary authentication factor. For example, the e-commerce site may reference the previous password value in the log 140, and may revert to that value. As another example, the e-commerce site may discard the request to transfer account funds from a queue of pending transactions.

In some implementations, based on the determination that the account user has not been successfully proven, the account may be disabled. For example, the requestor 116 may be disconnected from the account, and the account may be locked until security has been reestablished by the e-commerce site.

During state (G), based on determining that the identity of the account user has not been successfully proven using the second authentication factor, the e-commerce site transmits a message to the device associated with the owner of the accessed account to indicate that the information used to prove identity using the first authentication factor may have been compromised. For example, the e-commerce site may transmit such a message to the client device 102 of the account owner 112 to inform the account owner that another user (e.g., the requestor 116) may have access to the name and password of the account owner.

In some implementations, the message may initiate an automated password change protocol on the device associated with the owner of the accessed account. For example, the message transmitted by the e-commerce site to the client device 102 may include information related to a password change.

During state (H), the device associated with the accessed account may present an alert indicating that the information used to prove identity may have been compromised. For example, the authentication assistant 124 executed by the client device 102 may intercept the message and display corresponding message text (e.g., "Account hacked!") to the account owner 112. The authentication assistant 124 may also present an interface enabling the account owner 112 to change his or her password. For example, the account owner may enter a new password using a user interface control 152. The new password may be transmitted to the e-commerce site, for example, to reestablish account security.

An example sequence of states (A) to (H) has been described in which the requestor 116 has successfully proven a first authentication factor (e.g., a valid account name and password), but has not successfully proven a second authentication factor (e.g., possession of a device associated with the account owner). However, if the account owner 116 had been the user to initially access the e-commerce site account, for example, he or she would have responded "Yes" during state (D) regarding the password change, proving his or her identity using the second authentication factor.

Based on the response, for example, during state (F) the e-commerce site would have kept the logged password would have committed the logged request for transfer of account funds. Thus, account changes requested by the account owner 112 after proving his or her identity using the first authentication factor and before using the second authentication factor would be deemed as authorized by the e-commerce site.

Figure 2:
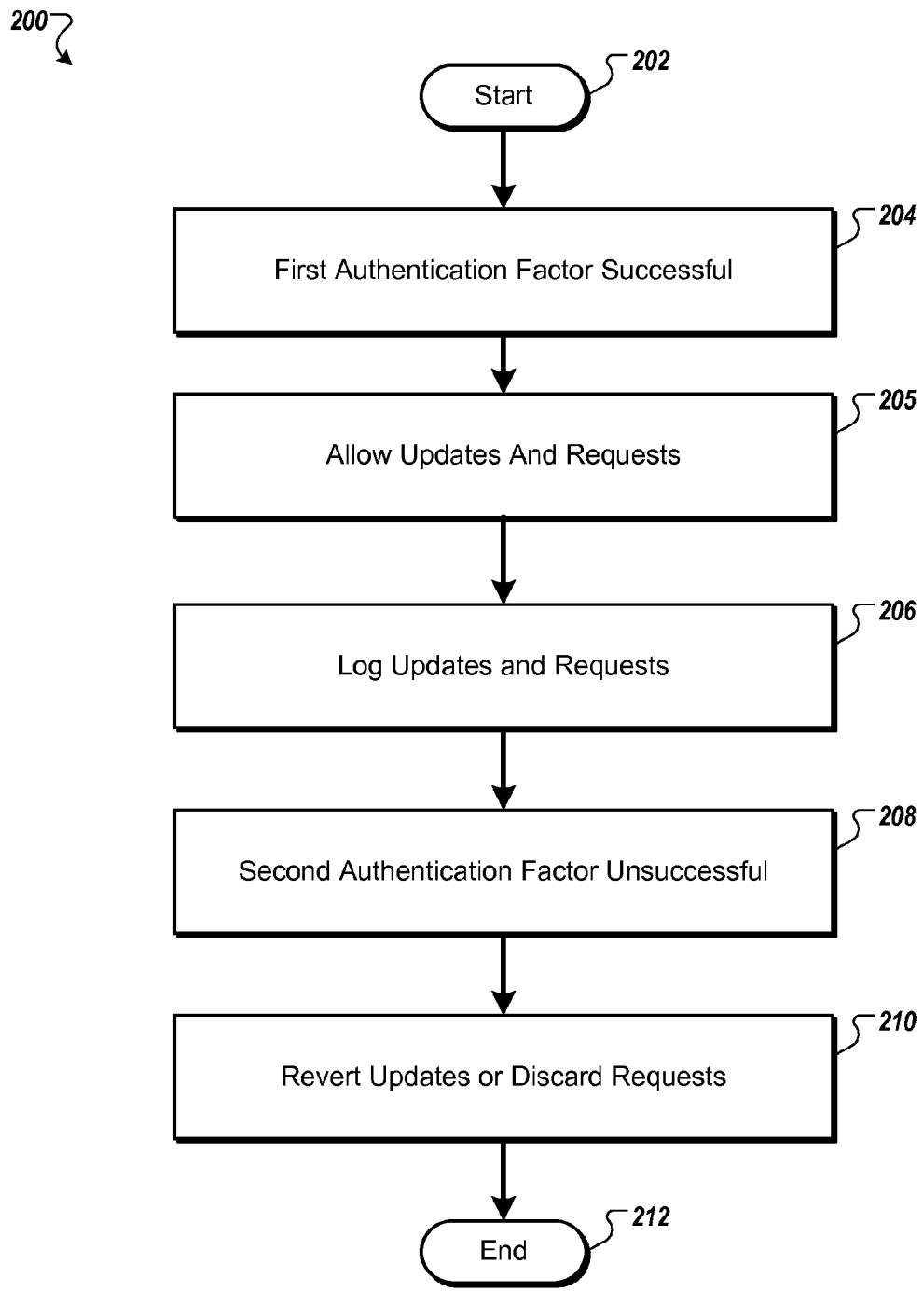
FIG. 2 is a flow chart illustrating an example process for reverting updates or discarding requests based on a determination that a user has not successfully proven their identity.

FIG. 2 is a flow chart illustrating an example process 200 for reverting updates or discarding requests based on a determination that a user has not successfully proven their identity. Briefly, the process 200 includes determining that a first authentication factor is successful, logging updates and requests, determining that a second authentication factor is unsuccessful, and reverting updates or discarding requests.

In more detail, when the process 200 begins (202), a first authentication factor is determined to be successful (204). As described above, the first authentication factor may include information that the user may know, such as user or account identification information, passwords, and the like. For example, an account user may provide an account ID and password to an e-commerce site as part of a login process. The account user may log in to the e-commerce site using a web page presented by a browser executed by a desktop or mobile computing device, for example.

Upon verifying the account ID and password, the e-commerce site may provide the account user with access to the account, allowing the account user to initiate updates or requests for updates (205). In some implementations, certain account functions and information may be limited by the e-commerce site after granting account access to the user before confirming user identity with a second authentication factor. For example, sensitive information such as passwords, credit card numbers, and the like, may be limited. As another example, access to potentially sensitive account functions such as password changes, financial transactions, and user communications may be limited.

The updates and requests are logged by the system (206). In general, account updates and requests for updates initiated by the account user may be logged after the identity of the user has been proven using the first authentication factor. For example, updates and requests for updates may be stored in a log maintained in memory or persistent storage by a computer system (e.g., an e-commerce site, a banking site, or the like).

Updates and requests for updates may be logged for various types of account transactions. For example, logging updates or requests for updates may include logging a current and a new password, logging a request to transfer money, logging an order, logging an item that has been placed into an online shopping cart, and other such transactions.

In general, the logging of account updates and requests for updates includes logging an old value and a new value. For example, an e-commerce site may receive a request from the account user to update an address associated with the user. In some implementations, the update request may be processed immediately. For example, if the address information is not determined by the e-commerce site to be highly sensitive, the e-commerce site may log the old address value and the new address value, and may perform the address update. The e-commerce site may also log information identifying data that the requester has viewed after successful authentication using the first authentication factor.

In some implementations, the update request may be logged based upon receiving the request, but not committed until the identity of the user is proven using the second authentication factor. For example, if the address information is determined by the e-commerce site to be highly sensitive, the new address value may be logged by the e-commerce site, but not committed until the site receives further confirmation of the identity of the user. As another example, financial transactions of a value below a certain monetary threshold may be logged and processed immediately, and transactions above the threshold may be logged but not committed until receiving further confirmation.

In some implementations, user preferences may be included as a factor for determining which information and which transactions are to be considered as sensitive. For example, the e-commerce site may include an interface enabling users to specify which information is to be considered as sensitive, and to specify monetary thresholds for financial transactions. In some implementations, information and transaction sensitivity may be determined by administrators of the systems processing the updates and requests for updates.

The second authentication factor is determined to be unsuccessful (208). For example, the account user may have failed to prove his or her identity using the second authentication factor. In some implementations, determining that the user has not successfully proven their identity may include receiving information that someone other than an account owner has entered in response to the second authentication factor. For example, after proving the identity of an account user using the first authentication factor (e.g., the account ID and password), the e-commerce system may send a confirmation message to a device associated with the account owner.

If, for example, the first authentication factor had been proven by a malicious user who had somehow acquired the account ID and password of the account owner, and if the malicious user had somehow intercepted the confirmation message intended for the device of the account owner, a response message generated by the malicious user for proving the second authentication factor may be determined by the e-commerce system to be fraudulent.

Figure 3:
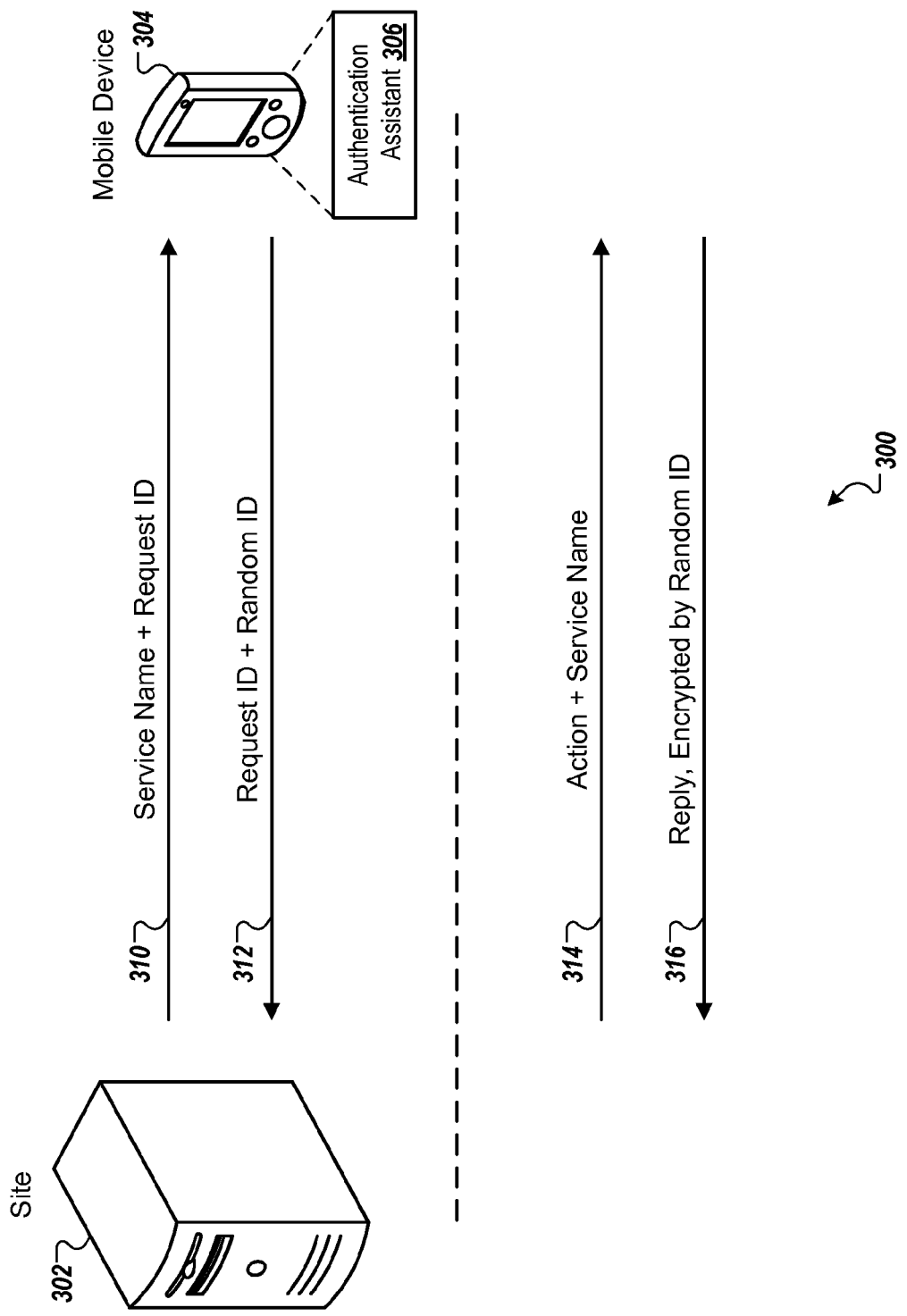

The device of the account owner may have been previously registered with the e-commerce site using a registration protocol (shown in FIG. 3). Using a shared secret key generated during the registration protocol, for example, responses to confirmation messages may be verified by the e-commerce site as having originated from the registered device of the account owner, and having not originated from a device of the malicious user. Upon registering, the e-commerce site may install an application, such as an authentication assistant application, on the device of the account owner, to facilitate the account owner proving their identity using the second authentication factor.

In some implementations, determining that the user has not successfully proven their identity using the second authentication factor may include determining that a predetermined period of time has elapsed. For example, an account user may access an e-commerce site using a web browser executed by a desktop computer. Upon receiving a valid account ID and password from the account user, for example, the e-commerce site may grant the user access to the account, start a timer associated with the account access, and send a message requesting confirmation of the account access to a device (e.g., a mobile phone) associated with the account owner.

If the e-commerce site does not receive a response to the confirmation message from the account owner within a certain period of time (e.g., two minutes, five minutes, ten minutes, or some other time period), the e-commerce site may determine that the account user has not proven his or her identity using the second authentication factor. The account owner may not respond to the confirmation message for a variety of reasons. For example, the account user in the present example may not be the same individual as the account owner. Thus, for example, the account user may not have access to the device associated with the account owner, and the account owner may have left the device unattended, not anticipating receipt of the message requesting confirmation of the account access.

In some cases, actions performed by the e-commerce site upon determining that the predetermined period of time has elapsed or upon determining that someone other than the account owner has entered information in response to the second authentication factor may be similar to actions performed by the e-commerce site upon receiving a negative response to the confirmation message from the account owner. For example, upon determining that the identity of the account user has not been successfully proven using the second authentication factor (regardless of the technique), updates and requests for updates performed and logged while the account user had access may be reverted or discarded. In some implementations, the e-commerce site may present a notification to the account user that certain updates and requests for updates may be reverted or discarded if the identity of the user is not proven using the second authentication factor.

Updates are reverted or requests are discarded (210), thereby ending the process (212). Upon determining that the identity of the account user has not been successfully proven using the second authentication factor, previously performed transactions may be reverted or "rolled back", and transactions that have been requested but not yet processed may be discarded.

In general, reverting updates includes changing a new value back to an old value. For example, to revert an update to an account address, the e-commerce site may access the log maintained in memory or persistent storage to identify the old value for the updated address, and may set the address to the old value.

To discard requests for updates, for example, the e-commerce site may access the log and may delete requests for updates associated with the account user. Updates may be reverted or requests for updates may be discarded for various account transactions. For example, reverting an update or discarding a request for update may include changing a new password back to a current password, discarding a request to transfer money without actually transferring the money, cancelling an order, removing an item from an electronic shopping cart, or some other such action.

FIG. 3 is a diagram of an example system 300 that may authenticate user identity. FIG. 3 also illustrates an example flow of messages between a website server ("site") 302 and a mobile client communication device ("mobile device") 304. In general, a user of the mobile device 304 may register the device with the site 302 through a registration protocol. After registration, the mobile device 304 may be used as a secondary authentication factor by the user to prove his or her identity to the site 302.

To initiate the registration protocol, the user may visit a webpage associated with the site 302, and may provide the site with information to be used for communicating with the mobile device 304. For example, the user may provide device information such as one or more phone numbers, e-mail addresses, instant messaging addresses, MAC addresses, IP addresses, and the like, to the site 302, where the information may be stored for future use. In some implementations, the user may receive from the site 302 application code for executing an authentication assistant 306. In some implementations, the authentication assistant 306 may be pre-installed on the mobile device 304.

Using the communication information provided by the user, the site 302 may send a message 310 to the mobile device 304 including a service name and a request ID. In some implementations, the message 310 may be included in a Short Message Service (SMS) message sent to the phone number of the mobile device 304. The service name included in the message 310 may represent a service, application, or function provided by the site 302, or may represent the site itself.

A particular e-commerce site may provide its own name as the service name. The request ID included in the message 310 may include information enabling the authentication assistant 306 to identify the message as part of the registration protocol. For example, the request ID may include a registration code uniquely identifying the user's registration request. Upon receiving the message 310, the authentication assistant 306 executed by the mobile device 304 may identify the message as a request by the site 302 to continue the registration protocol, and may generate and store a random ID (i.e., a secret key) in response to the request.

The mobile device 304 may provide the random ID to the site 302 by sending a message 312 including the random ID and the request ID. In some implementations, the message 312 may be sent through a Hypertext Transfer Protocol Secure (HTTPS) channel to protect the confidentiality of the message. Upon receiving the message 312, for example, the site 302 may identify the message as a continuation of the registration protocol for the mobile device 304, and may store the random ID in association with other account information for the device user. In some implementations, the registration process may be considered complete, as the site 302 has a shared random ID generated by the authentication assistant 306, and has information which may be used for communicating with the mobile device 304 (e.g., the phone number).

After completing the registration process, for example, the system 300 may use the shared random ID and the device communication information for proving user identity using a second authentication factor (e.g., possession of the device 304). For example, after logging into the site 302, an account user may begin using the site. The site 302 may use login information (e.g., an account ID or user name) provided by the account user, for example, to reference the communication information for the mobile device 304.

Using the communication information, the site may send a message 314 to the mobile device 304 including the service name and an action. In some implementations, the action may include a code enabling the authentication assistant 306 to identify an appropriate alert or message for presentation to a device user. For example, if the action includes a code instructing the authentication assistant 306 to "verify login", the assistant may present an alert message to the device user such as "Did you change your password?", and may present controls enabling the user to respond "Yes" or "No". In some implementations, the message 314 may include a timestamp for the updates or requests for updates initiated by the account user.

The timestamp may be associated with a password change requested by the account user. The timestamp, for example, may be presented as information to the device user. In some implementations, the message 314 may include communication information for the site 302. For example, the message 314 may include a reply uniform resource locator (URL) and a reply phone number. If the mobile device 304 has access to the Internet, for example, it may use the reply URL for sending a response message. If the mobile device does not have Internet access, for example, it may use the reply phone number.

Based on the response of the device user, the mobile device 304 may send a response message 316 including a reply, encrypted by the random ID. For example, the reply may be entered by the device user in response to the alert message. Upon receiving the message 316, the site 302 may retrieve the random ID from information associated with the account owner, and may decrypt the message 316 to obtain the reply. In the present example, if the reply is "Yes" in regard to the password change, the site 302 may determine that the identity of the account user has been proven. If the reply is "No", for example, the site 302 may terminate the session of the account user, revert the password change, and send a message to the mobile device 304 prompting the device user to take further actions to secure his or her account.

Figure 4:
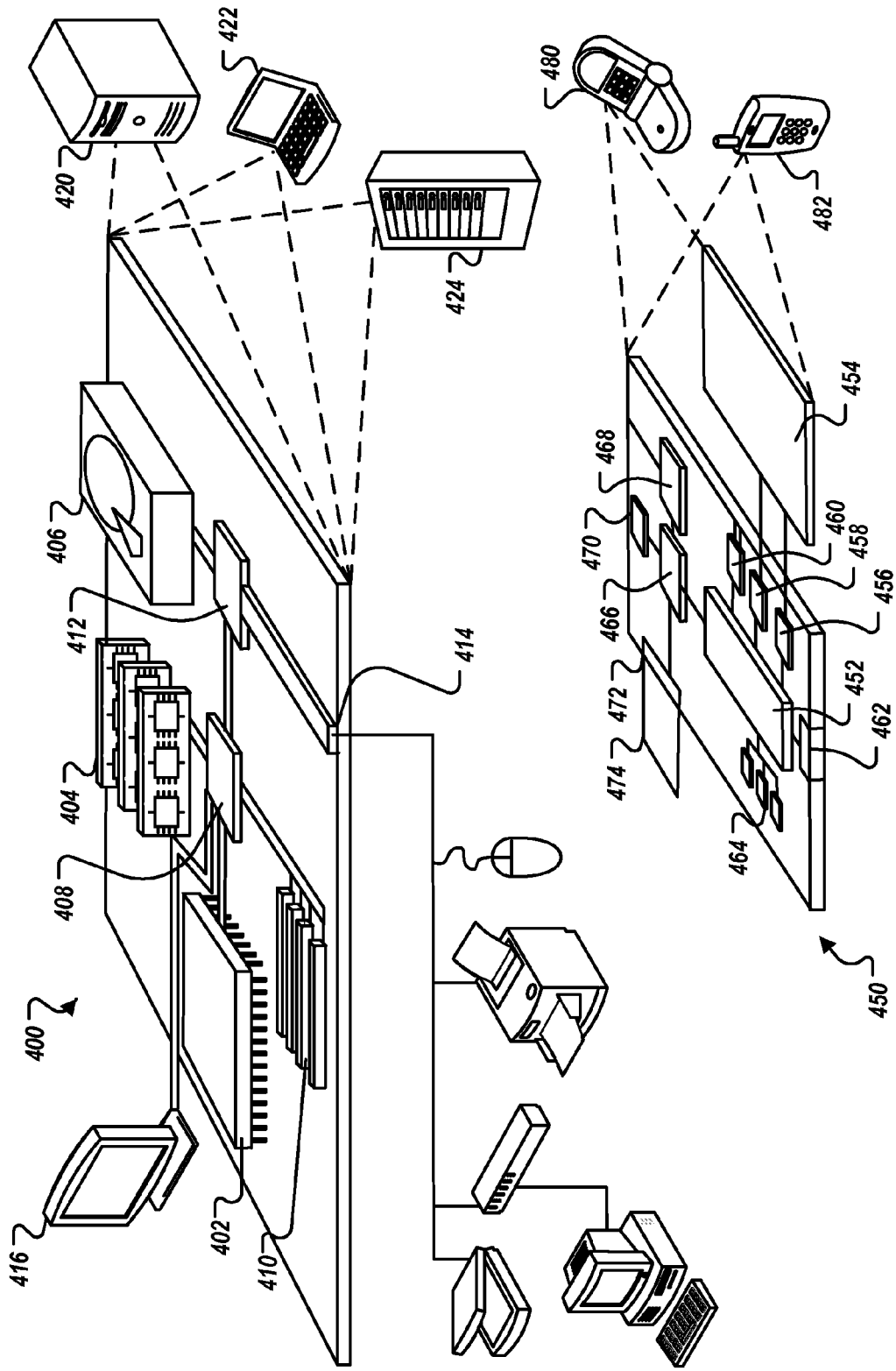
FIG. 4 shows an example of a generic computer device and a generic mobile computer device.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network).

Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   one or more computers; and
   a non-transitory computer-readable medium coupled to the one or more computers having instructions stored thereon which, when executed by the one or more computers, cause the one or more computers to perform operations comprising:
      determining, based on received information, that an identity of a user has been successfully proven using one of multiple authentication factors;
      allowing requests for updates to be initiated after the identity of the user has been successfully proven using the one authentication factor and before the identity of the user has been successfully proven using another of the multiple authentication factors, wherein the requests for updates that are allowed to be initiated after the identity of the user has been successfully proven are of a type that require the identity of the user to be successfully proven using the other of the multiple authentication factors before they are completed;
      queuing the requests for updates that are initiated after the identity of the user has been successfully proven using the one authentication factor;
      determining, based on additional received information, that the identity of the user has not been successfully proven using the other of the multiple authentication factors; and
      aborting, without completing, the previously queued requests for updates, based on determining that the identity of the user has not been successfully proven using the other of the multiple authentication factors.

2. The system of claim 1, wherein the operations further comprise:
   transmitting a message to a client device to allow the user to prove the identity of the user using the other of the multiple authentication factors, wherein the client device is a mobile device associated with the user.

3. The system of claim 1, wherein determining that the user has not successfully proven the identity of the user based on additional received information further comprises:
   receiving information that the user has entered in response to the other of the multiple authentication factors; and
   determining, based on the information that the user has entered, that the identity of the user has not been successfully proven.

4. The system of claim 1, wherein determining that the user has not successfully proven the identity of the user based on additional received information further comprises:
   receiving information that someone other than the user has entered in response to the other of the multiple authentication factors; and
   determining, based on the information that the someone other than the user has entered, that the identity of the user has not been successfully proven.

5. The system of claim 1, wherein determining that the user has not successfully proven the identity of the user based on additional received information further comprises:
   determining that a predetermined period of time has elapsed; and
   determining, based on determining that the predetermined period of time has elapsed, that the identity of the user has not been successfully proven.

6. The system of claim 1, wherein the operations further comprise:
   based on determining that the identity of the user has not been successfully proven based on the additional received information, transmitting a message to a client device to indicate that information used to prove the user's identity using the first authentication factor may have been compromised, wherein the client device is the user's mobile device.

7. The system of claim 1, wherein the operations further comprise:
   based on determining that the identity of the user has not been successfully proven based on the additional received information, disabling an account of the user.

8. The system of claim 1, wherein the operations further comprise:
   based on determining that the identity of the user has not been successfully proven based on the additional received information, transmitting a message to a client device to initiate an automated password change protocol on the client device, wherein the client device is the user's mobile device.

9. The system of claim 1, wherein the operations further comprise:
   installing an application on a mobile device associated with the user, wherein the application facilitates proving the identity of the user using the other of the multiple authentication factors.

10. A computer-implemented method comprising:
    determining, based on received information, that an identity of a user has been successfully proven using one of multiple authentication factors;
    allowing requests for updates to be initiated after the identity of the user has been successfully proven using the one authentication factor and before the identity of the user has been successfully proven using another of the multiple authentication factors, wherein the requests for updates that are allowed to be initiated after the identity of the user has been successfully proven are of a type that require the identity of the user to be successfully proven using the other of the multiple authentication factors before they are completed;
    queuing the requests for updates that are initiated after the identity of the user has been successfully proven using the one authentication factor;

determining, based on additional received information, that the identity of the user has not been successfully proven using the other of the multiple authentication factors; and aborting, without completing, the previously queued requests for updates, based on determining that the identity of the user has not been successfully proven using the other of the multiple authentication factors.

11. The method of claim 10, further comprising:
transmitting a message to a client device to allow the user to prove the identity of the user using the other of the multiple authentication factors, wherein
the client device is the user's mobile device.

12. The method of claim 10, wherein determining that the user has not successfully proven the identity of the user based on additional received information further comprises:
receiving information that the user has entered in response to the other of the multiple authentication factors; and
determining, based on the information that the user has entered, that the identity of the user has not been successfully proven.

13. The method of claim 10, wherein determining that the user has not successfully proven the identity of the user based on additional received information further comprises:
receiving information that someone other than the user has entered in response to the other of the multiple authentication factors; and
determining, based on the information that the someone other than the user has entered, that the identity of the user has not been successfully proven.

14. The method of claim 10, wherein determining that the user has not successfully proven the identity of the user based on additional received information further comprises:
determining that a predetermined period of time has elapsed; and
determining, based on determining that the predetermined period of time has elapsed, that the identity of the user has not been successfully proven.

15. The method of claim 10, further comprising:
based on determining that the identity of the user has not been successfully proven based on the additional received information, transmitting a message to a client device to indicate that information used to prove the user's identity using the first authentication factor may have been compromised, wherein the client device is the user's mobile device.

16. The method of claim 10, further comprising:
based on determining that the identity of the user has not been successfully proven based on the additional received information, disabling an account of the user.

17. The method of claim 10, further comprising:
based on determining that the identity of the user has not been successfully proven based on the additional received information, transmitting a message to a client device to initiate an automated password change protocol on the client device, wherein the client device is the user's mobile device.

18. The method of claim 10, further comprising:
installing an application on a mobile device associated with the user, wherein the application facilitates proving the identity of the user using the other of the multiple authentication factors.

19. A tangible computer storage device storing software comprising instructions executable by one or more computers which, upon such execution, cause the one or more computers to perform operations comprising:

determining, based on received information, that an identity of a user has been successfully proven using one of multiple authentication factors;

allowing requests for updates to be initiated after the identity of the user has been successfully proven using the one authentication factor and before the identity of the user has been successfully proven using another of the multiple authentication factors, wherein the requests for updates that are allowed to be initiated after the identity of the user has been successfully proven are of a type that require the identity of the user to be successfully proven using the other of the multiple authentication factors before they are completed;

queuing the requests for updates that are initiated after the identity of the user has been successfully proven using the one authentication factor;

determining, based on additional received information, that the identity of the user has not been successfully proven using the other of the multiple authentication factors; and aborting, without completing, the previously queued requests for updates, based on determining that the identity of the user has not been successfully proven using the other of the multiple authentication factors.

20. The computer storage device of claim 19, wherein the operations further comprise:
transmitting a message to a client device to allow the user to prove the identity of the user using the other of the multiple authentication factors, wherein the client device is the user's mobile device.

21. The computer storage device of claim 19, wherein determining that the user has not successfully proven the identity of the user based on additional received information further comprises:
receiving information that the user has entered in response to the other of the multiple authentication factors; and
determining, based on the information that the user has entered, that the identity of the user has not been successfully proven.

22. The computer storage device of claim 19, wherein determining that the user has not successfully proven the identity of the user based on additional received information further comprises:
receiving information that someone other than the user has entered in response to the other of the multiple authentication factors; and
determining, based on the information that the someone other than the user has entered, that the identity of the user has not been successfully proven.

23. The computer storage device of claim 19, wherein determining that the user has not successfully proven the identity of the user based on additional received information further comprises:
determining that a predetermined period of time has elapsed; and
determining, based on determining that the predetermined period of time has elapsed, that the identity of the user has not been successfully proven.

24. The computer storage device of claim 19, wherein the operations further comprise:
based on determining that the identity of the user has not been successfully proven based on the additional received information, transmitting a message to a client device to indicate that information used to prove the user's identity using the first authentication factor may have been compromised, wherein the client device is the user's mobile device.

25. The computer storage device of claim 19, wherein the operations further comprise:
  based on determining that the identity of the user has not been successfully proven based on the additional received information, disabling an account of the user.

26. The computer storage device of claim 19, wherein the operations further comprise:
  based on determining that the identity of the user has not been successfully proven based on the additional received information, transmitting a message to a client device to initiate an automated password change protocol on the client device, wherein the client device is the user's mobile device.

27. The computer storage device of claim 19, wherein the operations further comprise:
  installing an application on a mobile device associated with the user, wherein the application facilitates proving the identity of the user using the other of the multiple authentication factors.

* * * * *